United States Patent [19]

Frosch et al.

[11] 4,135,367
[45] Jan. 23, 1979

[54] THERMAL ENERGY TRANSFORMER

[76] Inventors: Robert A. Frosch, Administrator of the National Aeronautics and Space Administration, with respect to an invention of C. Martin Berdahl, Sierra Madre; Carl L. Thiele, Pasadena, both of Calif.

[21] Appl. No.: 824,024

[22] Filed: Aug. 12, 1977

[51] Int. Cl.² .............................................. F03G 7/02
[52] U.S. Cl. ...................................... 60/641; 60/508; 60/512; 126/271; 165/105
[58] Field of Search ............... 165/105; 126/271; 60/641, 508, 509, 512, 515

[56] References Cited

U.S. PATENT DOCUMENTS

| | | | |
|---|---|---|---|
| 1,661,473 | 3/1928 | Goddard et al. | 126/271 |
| 2,552,237 | 5/1951 | Trombe | 126/271 |
| 3,799,144 | 3/1974 | Ramsey et al. | 165/105 X |
| 3,950,947 | 4/1976 | Dirne et al. | 165/105 X |
| 4,033,118 | 7/1977 | Powell | 126/271 X |
| 4,067,315 | 1/1978 | Fehlner et al. | 165/105 X |

*Primary Examiner*—Allen M. Ostrager
*Attorney, Agent, or Firm*—Monte F. Mott; John R. Manning; Wilfred Grifka

[57] ABSTRACT

For use in combination with a heat engine, a thermal energy transformer comprising a flux receiver having a first wall defining therein a radiation absorption cavity for converting solar flux to thermal energy characterized by a first wall defining a radiation absorption cavity having a solar flux entry aperture, and a second wall defining an energy transfer wall for the heat engine, and a heat pipe chamber interposed between the first and second walls having a working fluid disposed within the chamber and a wick lining the chamber for conducting the working fluid from the second wall to the first wall, whereby thermal energy is transferred from the radiation absorption cavity to the heat engine.

10 Claims, 3 Drawing Figures

U.S. Patent
Jan. 23, 1979
4,135,367
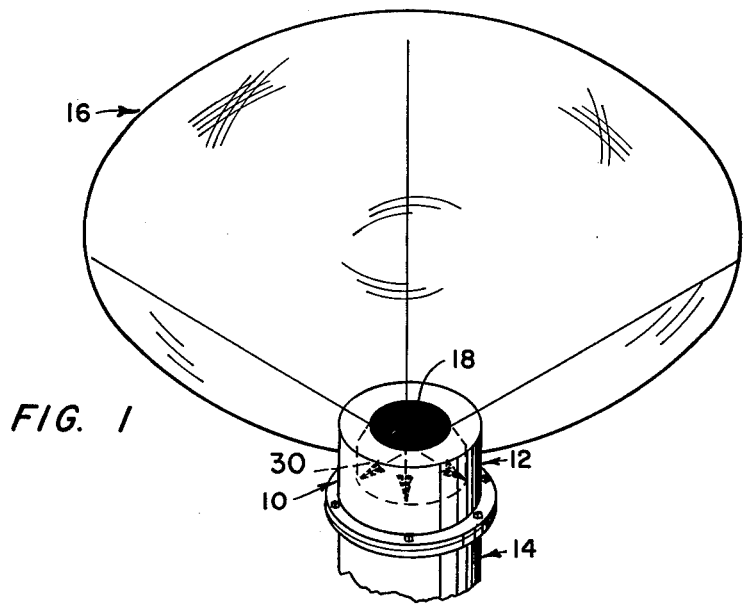
FIG. 1
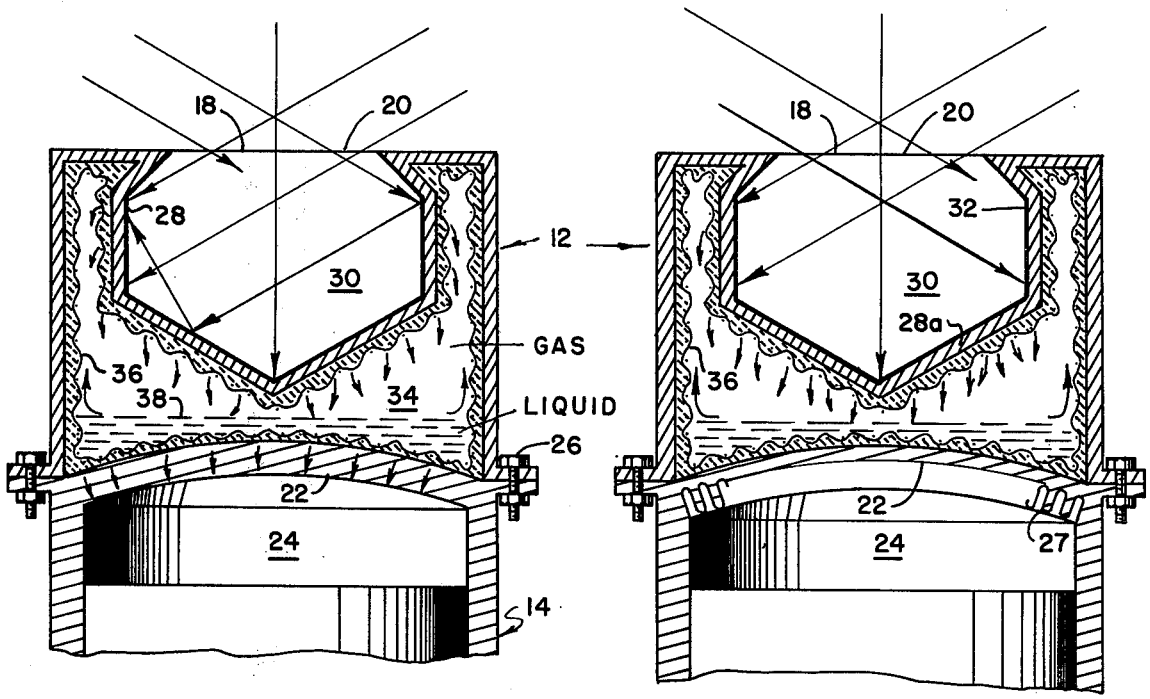
FIG. 2
FIG. 3

THERMAL ENERGY TRANSFORMER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The invention generally relates to energy transformers and more particularly to a solar energy transformer for interfacing solar flux with a heat operated engine.

In view of the current interest in providing improved systems through which increased utilization of solar energy may be realized, interest in developing engines directly driven by solar thermal energy has been intensified. Heat engines such as the Stirling Engine and Brayton engines, as well as various modifications thereof, tend to lend themselves to such usage since they require only an input of thermal energy in order to perform work, and the sun comprises an abundant source of thermal energy.

2. Description of the Prior Art

Numerous efforts have been made to couple collectors of solar thermal energy with heat operated engines. Unfortunately, because of low efficiency and attendant equipment failures, implementation of the previous concepts has not proven to be entirely satisfactory.

For example, it has been found that where tubing is employed for conducting a working fluid through a field of solar flux applied directly to the external surfaces of the tubing, the flux often is sufficient to develop hot spots in the walls of the tubing. Since the strength of tubing tends to diminish at higher temperatures, failure frequently occurs for thus rendering the system inoperative.

It should readily be apparent that there currently exists a need for a practical and economical system through which solar thermal energy is collected for transfer to heat operated engines, such as the Stirling Engine and the like which utilize heat energy in performing work.

It is, therefore, the general purpose of the instant invention to provide in combination with a heat operated engine a solar thermal energy transformer for delivering to the heat operated engine thermal energy derived from solar flux which overcomes the aforementioned difficulties and disadvantages.

OBJECTS AND SUMMARY OF THE INVENTION

It is therefore an object of the instant invention to provide an improved energy transformer.

It is another object to provide in a system characterized by a heat engine an energy transformer adapted to be connected with the heat operated engine for interfacing therewith solar flux.

It is another object to provide in combination with a heat operated engine including an expansion chamber, a solar thermal energy transformer for delivering to the heat operated engine thermal energy derived from solar flux.

It is another object to provide in an energy transformer system a solar flux receiver including a black body cavity for absorbing thermal solar energy, a heat pipe cavity coupling the solar flux receiver with a heat operated engine for transferring thermal energy from the cavity to the engine.

It is another object to provide in combination with a heat operated engine a flux receiver having a wall defining therein a cavity for converting solar flux to thermal energy mounted on an energy transfer wall for a heat engine and coupled with the energy transfer wall through a heat pipe chamber including a working fluid disposed within the chamber and a wick lining the chamber for conducting working fluid from the energy transfer wall to the wall of the radiation absorption cavity.

Another object of the instant invention is to provide an improved energy transformer which is particularly useful in connection with providing an energy input to a heat operated engine, although not necessarily restricted in use thereto since the transformer has utility when employed with other devices such as a thermal heat storage unit and/or to serve as a low pass filter to reduce fluctuations in thermal energy delivery.

These and other objects and advantages are achieved through the use of a solar thermal energy transformer, connected in combination with a heat operated engine, for delivering to the heat operated engine thermal energy derived from solar flux including a flux receiver having a wall defining therein a radiation absorption cavity for converting solar flux to thermal energy and characterized by a heat pipe chamber interposed between the heat operated engine and the flux receiver for transferring heat from the flux receiver to the heat operated engine, and an optic system for directing a beam of solar energy toward a flux entry aperture for said cavity having a relatively small ratio of focal length to cavity diameter, whereby a highly concentrated beam of solar flux is afforded access to the flux absorption cavity, as will become more readily apparent by reference to the following description and claims in light of the accompanying drawings.

BRIEF DESCRIPTION OF THE DRAWINGS

FIG. 1 is a diagrammatic, perspective view, not to scale, illustrating a thermal energy transformer which embodies the principles of the instant invention connected with a heat engine in an operative environment.

FIG. 2 is a cross-sectional view, not to scale, of the transformer shown in FIG. 1.

FIG. 3 is a cross-sectional view, similar to FIG. 2, illustrating a slightly modified head for the heat engine.

DESCRIPTION OF THE PREFERRED EMBODIMENT

Referring now to the drawings wherein like reference characters designate like or corresponding parts throughout the several views, there is shown in FIG. 1 an energy transformer system which embodies the principles of the instant invention.

As shown in FIG. 1, the system includes a transformer 10 which includes a flux receiver 12 coupled with a heat operated engine 14. The transformer 10 is disposed along the axis of a parabolic reflector, generally designated 16. The reflector 16 serves to direct a highly concentrated beam of solar flux through an aperture 18 defined within the receiver 12, having an entry plane 20. The function of the aperture 18 will hereinafter become more readily apparent.

As shown in the drawings, the heat operated engine comprises a typical Beal version of a Stirling Engine power unit. In this type of engine, energy input is applied directly through the engine's head, as best illustrated in FIG. 2. As shown, the heat operated engine 14 includes a dome-shaped head 22, formed of a heat conductive metal, the purpose of which is to serve as a heat transfer wall. It will be appreciated, therefore, that heat is, in operation, delivered through the wall to an expansion chamber, designated 24, of the engine 14. Since Stirling Engine power units are well known, and the particular engine employed forms no part of the instant invention, a detailed description of the engine 14 is omitted in the interest of brevity. However, it will be appreciated that the receiver 12 of the transformer 10 is mounted on the engine 14 employing any suitable means such as nut and bolt assemblies, and serves as a source of heat for the chamber 24 which serves to operate the engine 14 in accordance with the principles of known engines.

The efficiency of the system may be enhanced simply by providing expansion holes 27 in the head 22, as shown in FIG. 3, which maximizes the area for heat exchange, while maintaining minimum resistance to flow as gas within the expansion chamber 24 expands and contracts throughout cyclic operations.

The flux receiver 12 preferably is of integral construction and comprises a wall 28 stamped, molded, or otherwise fabricated to form a radiation absorption cavity 30 communicating with the aperture 18, the purpose of which is to receive and entrap solar flux passed through the aperture 18 from the reflector 16. As shown, the wall 28 forming the cavity 30 includes a plurality of planar segments 28a which collectively impart a curved configuration to the wall of the cavity. As a practical matter, the overall configuration of the wall forming the cavity generally conforms to a segment of an oblate sphere.

It should at this juncture be noted that the diameter of the radiation absorption cavity 30 is greater than the diameter of the aperture 18, while the diameter of the aperture 18 is such as to receive rays of solar flux from the extreme edge of the reflector 16. By establishing a ratio for the focal length of the reflector 16 to the diameter of the cavity 30, on the order of 1:2, a highly concentrated beam of solar flux can be introduced into the cavity through a relatively small aperture.

The beam of flux, of course, diverges rapidly after entry into the cavity and is reflected back and forth until the energy is completely absorbed. However, in order to enhance the absorptivity of the cavity 30, the surface of the cavity is coated with a lining 32 of anti-reflective material, such as carbon black, whereby the cavity 30 is caused to function as a black box cavity. Consequently, due to the relatively small diameter of the aperture 18 and the lining 32 of anti-reflective material, re-radiation from the cavity 30 is minimized. Thus a relatively high percentage of the available thermal energy obtained from the solar flux is made available for transfer to the heat operated engine 14.

Transfer of heat from the cavity 30 to the heat operated engine 14 is achieved through a heat pipe chamber 34 which communicates with both the external wall of the radiation absorption cavity 30 and the heat transfer wall 22.

The heat pipe chamber 34, as a practical matter, is a closed chamber lined with a material comprising a wick, designated 36. The relative thickness dimension of the wick 36, as shown, is exaggerated for the sake of clarity. The wick 36, where desired, comprises a ceramic coating and serves to conduct a working fluid along the surface of the chamber 34 from the cooler heat transfer wall 22 of the heat operated engine 14 to the external surface of the wall 28. Within the heat pipe chamber 34, there is deposited a suitable working fluid 38, such as sodium liquid. The working fluid, of course, must have a capability of advancing along the wick 36 by capillary action toward the radiation absorption cavity 30, and yet be capable of being evaporated and condensed at operating temperatures. Therefore, the particular wick and working fluid employed are varied as desired.

Since the function and operation of heat pipes is a well understood phenomenon, a detailed description of the heat pipe chamber 34 is omitted in the interest of brevity. It suffices to understand that the heat transfer wall 22 comprises the cooler wall and normally is maintained at a temperature at which the working fluid in its vapor phase is condensed to its liquid phase, while the external surface of the wall defining the radiation absorption cavity 30 comprises the warmer wall and is maintained at temperatures sufficient to cause the working fluid to vaporize within the chamber 34. The wick 36, of course, serves as a conduit through which the working fluid in its liquid phase is delivered to the warmer external surface of the cavity 30, at which the working fluid is vaporized, while the volumetric space of the chamber provides a path for the working fluid to be returned and condensed at the heat transfer wall 22. The cyclic operation continues as long as sufficient solar flux impinges against the internal surfaces of the radiation absorption cavity to sufficiently elevate the temperature of the wall defining the cavity 30.

While not shown, it is to be understood that where desired, the receiver 12 is provided with an outer layer of insulation for further preventing loss of thermal energy from the system.

In view of the foregoing, it should readily be apparent that the receiver 12 and heat pipe chamber 34, in effect, function as a transformer, because the heat received at the relatively large surface area, which defines the radiation absorption cavity 30, is transferred to a much smaller work producing area, such as the heat transfer wall 22, at such a high transfer rate that virtually no temperature drop is experienced. Because of this high rate of energy transfer, a high degree of efficiency is achieved.

OPERATION

It is believed that in view of the foregoing description, the operation of the system will readily be understood and it will be briefly reviewed at this point.

The system hereinbefore described is so configured that the aperture 18 is positioned along the axis of the parabolic reflector 16 in a manner such that the virtual image of the sun appears in the entry plane 20 of the aperture 18, and the ratio of the focal length of the reflector to the diameter of the cavity is relatively small, on the order of 1:2. Consequently, a highly concentrated beam of solar flux, depicted by arrows in the drawings, passes through the aperture 18 and diverges rapidly within the radiation absorption cavity 30. Due to the anti-reflective nature of the lining 32 and the ratio of the diameter of the aperture 18 to the diameter of the radiation absorption cavity 30, re-radiation from the radiation absorption cavity 30 is minimized, if not totally eliminated. Since re-radiation from the radiation absorption cavity 30 is substantially precluded, a very high percentage of the solar thermal energy is made available for heat transfer purposes.

The heat energy received at the internal surface of the radiation absorption cavity 30 is transmitted by conduction through the wall of the cavity. As the exterior surface of the wall of the radiation absorption cavity 30 is elevated to a temperature at or above that at which vaporization of the working fluid within the chamber 34 occurs, the working fluid undergoes a phase change to its vapor state, and a cycle of heat pipe operation is thus initiated. The working fluid circulates as a gas within the heat pipe chamber 34 and travels to the cooler heat transfer wall 22, located at the bottom of the chamber. Heat thus transported by the vapor is then extracted therefrom and conducted to the expansion chamber 24 of the heat operated engine 14 by the heat transfer wall 22, whereupon the working fluid returns to its liquid phase or state. The heat thus transferred to the engine 14 causes the engine to function in a known manner which forms no specific part of the instant invention.

It will, of course, be appreciated that as the vaporized working fluid, upon giving up heat energy to the engine, again reverts to its liquid phase and is returned to the surfaces of the wall defining the radiation absorption chamber 30 through the capillary action of the wick 36. Thus a full cycle of operation for the system is completed.

In view of the foregoing, it should readily be apparent that the system which embodies the principles of the instant invention provides a practical and economical solution to the problem of coupling solar thermal energy collectors with heat operated engines and the like.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. In an energy transformer system for deriving thermal energy from incident solar flux and transferring the derived energy to a heat responsive system, the improvement comprising:
    A. a flux receiver including a curved wall formed of a heat conductive metal defining a radiation absorption cavity characterized by an internal surface, an external surface, and a flux acceptance aperture;
    B. a heat transfer wall for heat responsive means;
    C. means mounting said receiver on said heat transfer wall; and
    D. means defining between the external surface of said radiation absorption cavity and said heat transfer wall, a heat pipe chamber communicating with the curved wall and the heat transfer wall for transferring thermal energy from said cavity to said heat responsive means.

2. The improvement of claim 1 wherein said curved wall includes within the cavity a coating deposited on the wall for forming a black body cavity.

3. The improvement of claim 2 wherein the heat pipe chamber comprises a closed chamber and includes means defining therein a wick extended along the surface of the walls for conducting a working fluid from the heat transfer wall to the curved wall.

4. The improvement of claim 3 wherein said wick comprises a ceramic coating deposited on the surfaces of said walls and said working fluid comprises liquid sodium.

5. The improvement of claim 1 further comprising an optic system for focusing a beam of solar flux on said aperture.

6. In combination with a heat operated engine including an expansion chamber, a thermal energy transformer for delivering to the heat operated engine thermal energy derived from solar flux, comprising:
    A. a flux receiver having a first wall formed of heat conductive material defining a radiation absorption cavity for converting solar flux to thermal energy, and means defining for said cavity a solar flux entry aperture;
    B. means mounting said flux receiver on a second wall comprising an energy input wall for said heat engine; and
    C. means defining between said first wall and said second wall a heat pipe chamber simultaneously communicating with said radiation absorption cavity and said expansion chamber through said first wall and said second wall.

7. The solar thermal energy transformer of claim 6 wherein said radiation absorption cavity comprises a black body cavity, and said heat pipe chamber comprises a closed chamber confining therein a working fluid and a wick lining the chamber adapted to conduct said working fluid from the second wall to the first wall.

8. The solar thermal energy transformer of claim 7 wherein said wick comprises a coating of ceramic material and said working fluid comprises vaporizable sodium liquid.

9. The solar thermal energy transformer of claim 8 further comprising an optic system for directing a beam of solar energy on the aperture for said cavity.

10. The solar thermal energy transformer of claim 9 wherein the focal length of the optic system is substantially one-half the diameter of the cavity, the diameter of the aperture is smaller than the diameter of the cavity, and the plane of the virtual image of the sun is coincident with the entry plane of the aperture.

* * * * *